United States Patent
Chen

Patent Number: 6,031,636
Date of Patent: Feb. 29, 2000

[54] BATTERY-POWERED SCANNER

[75] Inventor: Ling-Chien Chen, Hsinchu, Taiwan

[73] Assignee: Avigramm Technologies Corporation, Hsinchu, Taiwan

[21] Appl. No.: 09/086,206

[22] Filed: May 28, 1998

[30] Foreign Application Priority Data

Mar. 18, 1998 [TW] Taiwan .................... 87203958

[51] Int. Cl.$^7$ .............. H04N 1/32; H04N 1/024; G06K 9/22
[52] U.S. Cl. ............... 358/442; 358/473; 382/313
[58] Field of Search .................. 358/473, 442, 358/468; 382/313

[56] References Cited

U.S. PATENT DOCUMENTS

| | | | |
|---|---|---|---|
| 5,392,447 | 2/1995 | Schlack et al. | 395/800 |
| 5,550,938 | 8/1996 | Hayakawa et al. | 358/473 |

*Primary Examiner*—Kimberly A. Williams
*Attorney, Agent, or Firm*—Christensen O'Connor Johnson & Kindness PLLC

[57] ABSTRACT

This invention discloses a battery-powered scanner that does not require use of commercial power source, wherein the scanner not only selects components of low power consumption but also implements high efficient and low worn switching regulation technique to convert power source supplied by a primary or secondary battery into working voltage for all components within the scanner so as to be utilized by the scanner in operation. To prevent the possibility of insufficient battery power supply, the scanner is provided with a power management device that terminates power supply to peripheral components of the scanner while the scanner in not in operation so as to conserve power consumption, and that activates power supply to all components when the scanner is in operation. The power management device further stops timing pulses other than those required to connect a control device and a computer connected to the scanner so as to reduce power consumption, whereby the scanner may be portable to various locations. This invention can certainly be connected to commercial power source.

1 Claim, 2 Drawing Sheets

BATTERY-POWERED SCANNER

BACKGROUND OF THE INVENTION

Because interfaces of the conventional personal computers, used to connect to external peripheral devices, are incapable of supplying high power or cannot supply power to external devices at all, most externally connected devices must utilize commercial power and thus fail to provide portability and accessibility. Because scanners are equipped with a plurality of components of high power consumption and lacks excellent power management, no solution has been found to reduce its high power consumption. Conventional scanners, thus, also fail to provide portability and accessibility. This invention discloses a battery-powered scanner that can be operated in any environment. The battery-powered scanner uses components of low power consumption and reliable power management so as to attain the effect of both accessibility and environmental protection. This invention further remedies the problem of insufficient power supplied by the interface.

SUMMARY OF THE INVENTION

It is an object of this invention to provide a scanner that does not require the use of commercial power.

It is another object of this invention to provide a batter-powered scanner of lower power consumption, where the scanner can be connected to a parallel port of a computer.

DETAILED DESCRIPTION OF THE INVENTION

Figure 1:
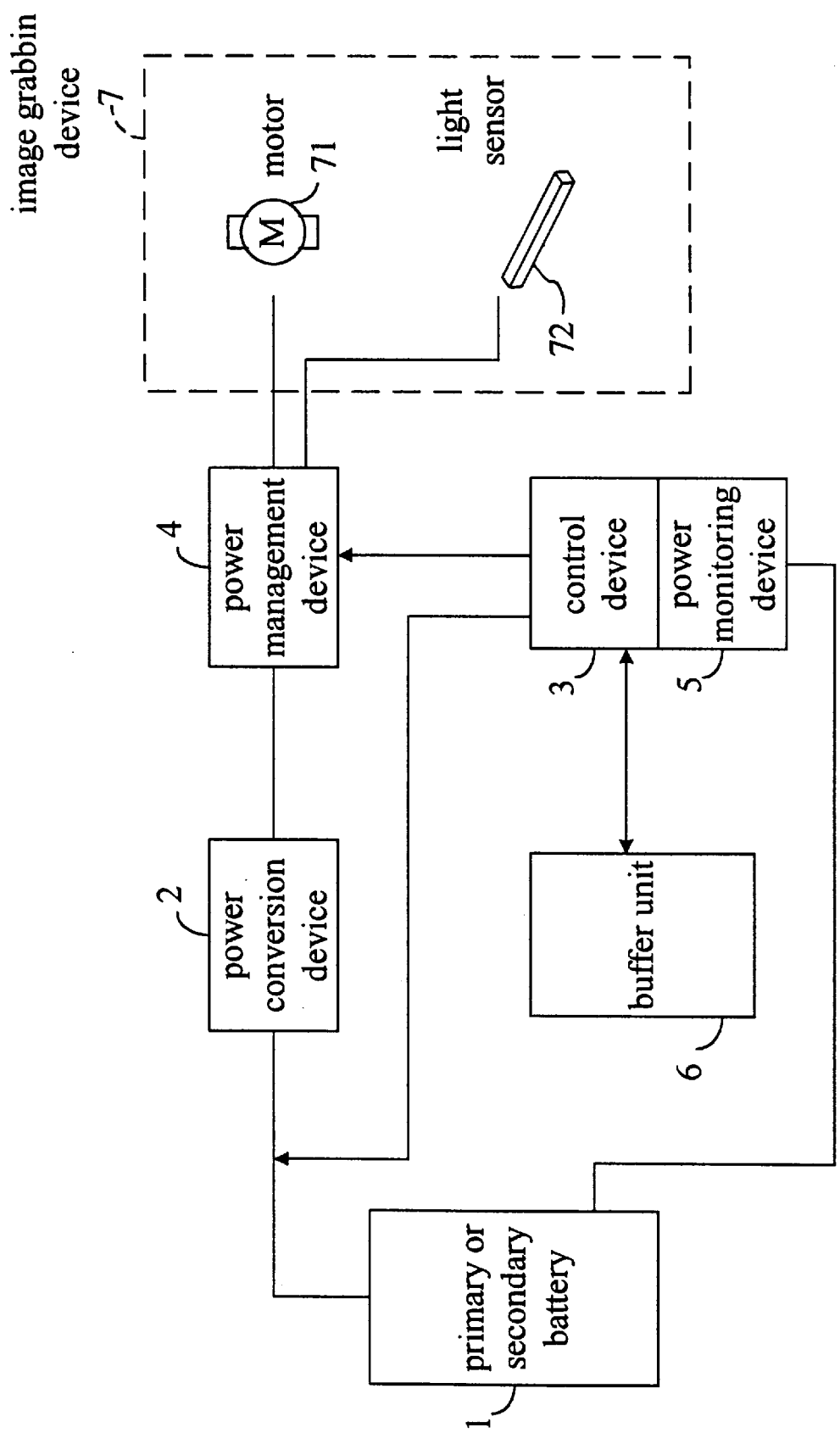
FIG. 1 is a block diagram showing the structure of a scanner of this invention.
Figure 2:
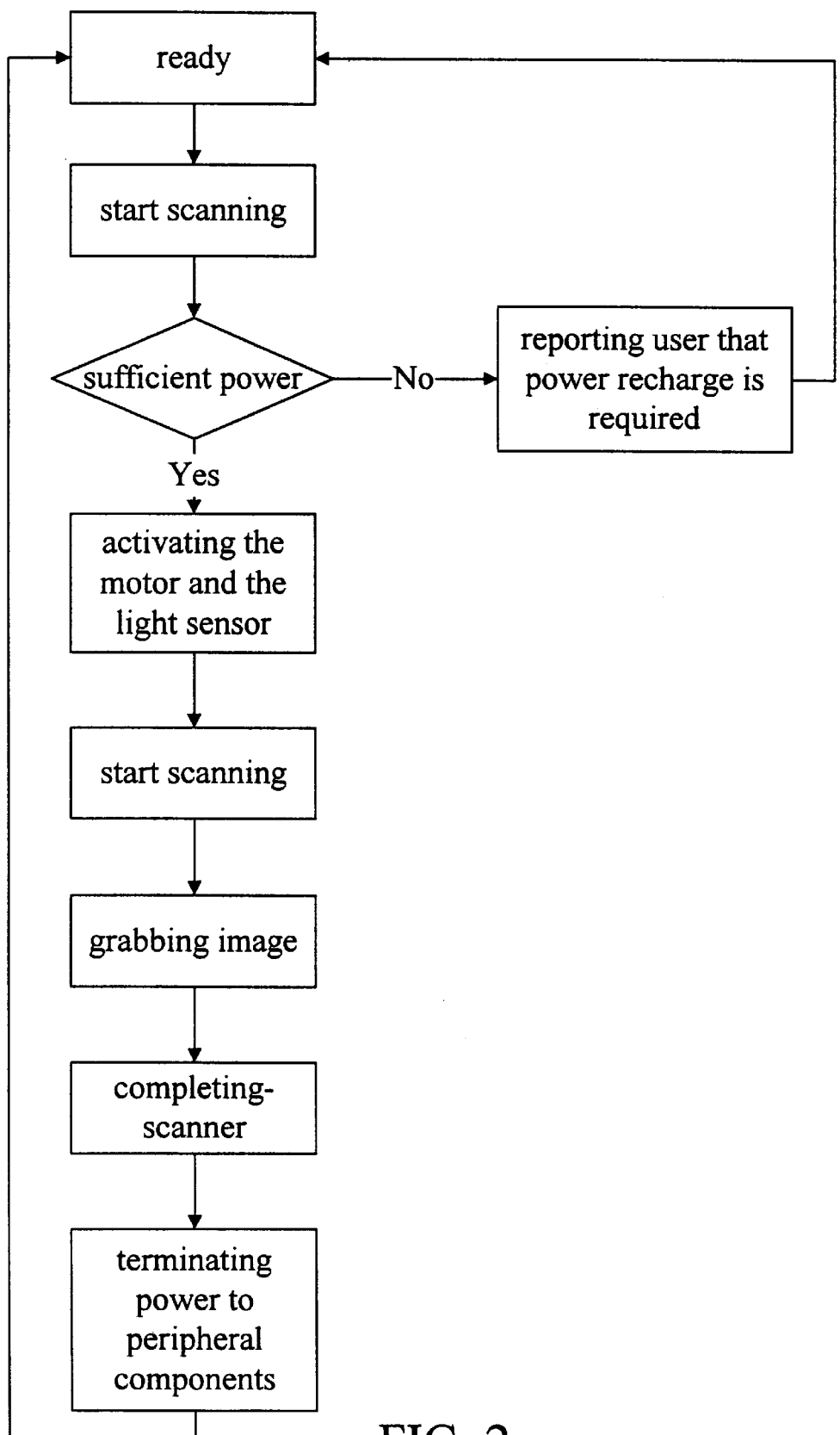
FIG. 2 is an operation flowchart of a scanner of this invention.

The invention discloses a battery-powered scanner of low source consumption and of high power. FIG. 1 illustrates a block diagram of an embodiment according to this invention, where a primary or secondary battery is used as power source of the scanner. The primary or secondary battery 1 supplies power to a power-conversion device 2. The power-conversion device 2 implements high efficient and low worn switching regulation technique to convert the power supplied by the primary or the secondary battery 1 into working voltages for all components within the scanner. A control device 3 is in charge of overall operation of the scanner, such as receiving commands from a parallel port of an externally connected computer (not shown in FIG. 1), and transmitting status signals to an external computer via a parallel port. An image-grabbing device 7 grabs image data, which is then transmitted to the externally connected computer by the control device 3 via the parallel port. When the scanner is under idle state, the control device 3 transmits commands to inform power management device 4 to shut off power converted by the power conversion device 2, and intended to be supplied to the components of the scanner, so as to conserve power consumption. At this moment, only power being supplied to the control device 3 is maintained at ON state and the remaining peripheral components are not supplied with any power, specifically components such as motor 71 and light sensor 72 of the image-grabbing device 7. On the contrary, when the scanner is reactivated, the power management device 4 activates power being supplied to all the components. In addition, the scanner is further provided with a power monitoring device 5 that is connected to the primary or secondary battery, and the control device 3, wherein the power monitoring device 5 monitors the status of the battery 1 and transmits status information of the battery 1 to the control device 3 so as to determine whether the battery 1 consists of sufficient power or whether the battery 1 needs to be recharged. In order to further reduce power consumption of the scanner, upon completion of each scanning operation, the control device 3 stops timing pulses other than those required to connect the control device 3 and the externally connected computer so as to reduce power consumption. FIG. 2 is an operation flowchart of the scanner of this invention.

Because rate of the image-grabbing device 7 for grabbing image data is faster than that of the control device 3 for transmitting the image data to the externally connected computer, the scanner is further provided with a buffer unit 6 for containing image data grabbed by the image-grabbing device 7. The control device 3 then transmits image data to the externally connected computer so as to synchronize operations of image grabbing and data transmission.

To attain the effects of low power consumption and easy reactivation, except the above power management system, the scanner of the invention utilizes peripheral components of lower power consumption, such as a low-voltage, high torque motor 71, light sensor 72, and a low-voltage buffer unit 6. In addition, the primary or secondary battery 1 may be by-passed if the scanner of the invention is connected to commercial power source, and can be also recharged simultaneously if it is a secondary battery.

What is claimed is:

1. A battery-powered scanner that is externally connected to a computer, comprising:

an image-grabbing device;

a primary or a secondary battery for supplying power to the scanner in operation;

a power-conversion device for converting the power supplied by the primary or the secondary battery into working voltage for all components within the scanner;

a control device for receiving commands from a parallel port of the computer, controlling operations of the scanner, and transmitting images scanned by the scanner to the externally connected computer, the control device stopping timing pulses other than those required to connect the control device and the externally connected computer upon completion of each scanning operation; and a power management device for shutting off power converted by the power-conversion device and intended to be supplied to the components of the scanner in accordance with commands generated by the control device so as to converse power consumption.

* * * * *